United States Patent [19]

Splitt et al.

[11] 4,293,887

[45] Oct. 6, 1981

[54] SURGE ARRESTER WITH IMPROVED IMPULSE RATIO

[75] Inventors: Frank G. Splitt, Mount Prospect; Donald B. Turner, Des Plaines, both of Ill.

[73] Assignee: Northern Telecom Inc., Nashville, Tenn.

[21] Appl. No.: 36,088

[22] Filed: May 4, 1979

[51] Int. Cl.³ .......... H02H 9/06

[52] U.S. Cl. .......... 361/120; 361/129

[58] Field of Search .......... 361/119, 120, 129; 313/213, 276

[56] References Cited

U.S. PATENT DOCUMENTS

| | | | |
|---|---|---|---|
| 3,388,274 | 6/1968 | Kawiecki et al. | 361/120 X |
| 3,588,576 | 6/1971 | Kawiecki | 361/120 X |
| 3,702,952 | 11/1972 | Cassidy et al. | 361/120 |
| 3,858,077 | 12/1974 | Bazarian et al. | 361/120 X |
| 4,084,208 | 4/1978 | Bazarian et al. | 361/120 |
| 4,187,526 | 2/1980 | Heinze et al. | 361/120 |

*Primary Examiner*—Harry E. Moose, Jr.
*Attorney, Agent, or Firm*—Spencer & Kaye

[57] ABSTRACT

A gas filled surge arrester having improved impulse ratio, characterized by an ion source in an electric field outside of the spark gap.

12 Claims, 7 Drawing Figures

SURGE ARRESTER WITH IMPROVED IMPULSE RATIO

FIELD OF THE INVENTION

The present invention relates to surge arresters in general and to those arresters having a gaseous arc-gap in particular. More particularly still, it is applicable to surge arresters having coaxial electrodes.

BACKGROUND OF THE INVENTION

A surge arrester is a device for connection between electrical terminals in order to prevent (arrest) an increase in voltage across those terminals if such voltage were to exceed a certain predetermined device dependent value. Surge arresters are thus utilized to protect personnel and equipment from undersirable, and usually unpredictable, momentary surges of electrical potential. Such devices exhibit very high impedance between terminals in order not to interfere with the normal functioning of the protected equipment until a voltage surge exceeding their threshold appears. They then switch (breakdown) to a low impedance, surge arresting mode, in order to dissipate the surge power by conducting it away from the protected terminals. When the surge ceases an arrester returns to its normal, high impedance mode.

An important parameter of surge arresters is the relative dependence of their actual breakdown voltage on the swiftness with which the surge voltage rises. The design value of breakdown voltage is based upon a slow rate of voltage rise, i.e., on the order of 100 volts per second. It is known that the breakdown voltage value increases with increasing surge voltage rates of rise. This is because of an inherent response time of the device, and surge arresters exhibit different actual breakdown thresholds with different surges.

This circumstance is expressed in the art by dividing the actual breakdown voltage with a fast rising surge by the design breakdown voltage (i.e., that for slow surges), which quotient is termed "impulse ratio". Thus an ideal surge arrester would have an impulse ratio of 1:1 for all surges fast or slow, because it has only one value of breakdown voltage.

A gas-filled surge arrester with improved impulse ratios is disclosed in U.S. Pat. No. 4,084,208, issued Apr. 11, 1978 to Bazarian and Bonneson. The therein disclosed arresters are said to have an impulse ratio of less than 2:1.

SUMMARY OF THE INVENTION

The object of the present invention is to provide gas-filled surge arresters with an impulse ratio approaching unity. Actually, surge arresters manufactured in accordance with the preferred embodiment, infra, exhibited an average impulse ratio of approximately 1.2:1 at a 100 volts per microsecond surge rate of rise. (A standard test point [STP]).

An important advantage of the present invention is that it permits the production of surge arresters having excellent impulse ratio without the need to incorporate radioactive additives for breakdown voltage stabilization. Elimination of radioactive materials, apart from being a cost saving, reduces hazards in the fabrication of gas tube arresters and enhances acceptability of the product.

Another advantage of the present invention is that it can be introduced into the conventional coaxial structure of surge arresters, without substantially altering that structure.

The present invention in its broadest aspect contemplates the provision of a suitable ion "donor" or "source" material at a stressed field location within a surge arrester but outside of the main spark (arc) gap region therein.

In a narrower aspect of the present invention, the ion source material is itself part of the stressed field creating structure, e.g., by being an electrode or the extension of an electrode which participates in creating a stressed field.

The location of the ion source, being outside of (and preferably remote from) the spark gap region, provides for a stable improvement in the impulse ratio, which is not significantly degraded through repetitive surge breakdown and the therewith attendant sputtering and erosion.

Suitable ion sources include graphite and graphite based materials such as Aquadag (pure graphite suspension in water by Acheson Colloids Company), sodium silicate and barium aluminate mixed with a sodium silicate binder. Low work function materials may be added to graphite but any beneficial effects thereof are uncertain.

It has been found that ion source materials should preferably not adhere too tightly to the substrate to which they are applied, although this is dependent on the intensity of the created stressed field, as may be expected.

Thus, according to the present invention there is provided a surge arrester having a design breakdown voltage value and having first and second electrodes defining a gaseous spark gap therebetween, characterized by a surface outside of said spark gap region at least partially covered with an ion source material adapted to emit ions into said spark gap region in response to an electric field. Of course, the ion emission should begin at a surge voltage in the vicinity of the design breakdown voltage.

There is further provided according to the present invention a surge arrester having first and second electrodes defining a gaseous spark gap region therebetween, characterized by a third electrode electrically connected to the first electrode and placed outside of the spark gap region contiguous a solid dielectric separating it from the second electrode, said third electrode being a conductive surface coating of an ion source material adapted to emit ions into said spark gap region in response to an electric field between the second and third electrodes.

Those skilled in the art will appreciate that the electric field freeing ions from the source material will depend on the position and configuration of the ion source coating as well as on the voltage developing thereacross.

BRIEF DESCRIPTION OF THE DRAWINGS

The present invention will be still better understood in the context of the following description of the preferred embodiment in conjunction with the accompanying drawings in which.

DESCRIPTION OF THE PREFERRED EMBODIMENT

Figure 1:
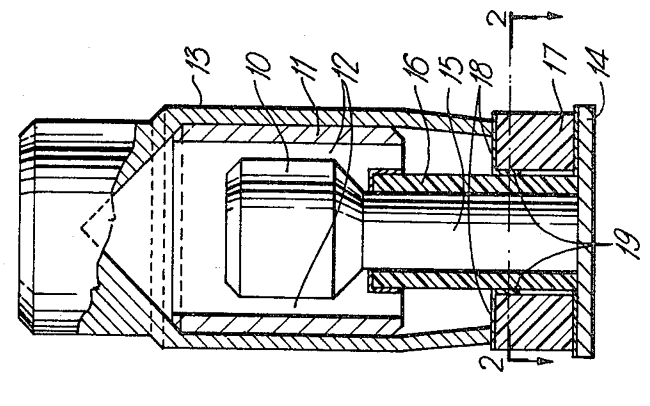
FIG. 1 is an axial cross-section of a two electrode surge arrester including the ion source coating of the present invention as a third electrode.

FIG. 1 of the drawings shows the basic structure of a conventional coaxial surge arrester having an inner electrode 10 and an outer electrode 11. The outer electrode 11 is cylindrical in shape and surrounds the inner electrode 10 thereby defining an arc gap region 12 therebetween. The space surrounding the electrode 10, and so the arc gap region, is filled with gas mixture designed to support the arc and insure as consistent a breakdown voltage as possible. Such a mixture may be 5 to 10% Hydrogen, 5 to 10% Argon and 85% Helium to a total pressure of approximately 200 mmHg STP. The outer electrode 11 is mechanically secured to the inside of a metallic tubular shroud 13 that is hermetically sealed at its one open end to a metallized ceramic insulating washer 17. The ceramic insulating washer 17 is, in turn, hermetically sealed to a metallic disc 14, which is the electrical contact for the inner electrode 10. The stem 15 of the inner electrode 10 is secured to the metallic disc 14 and is surrounded by a dielectric insulating sleeve 16. The ceramic insulating washer 17 separates the end of the shroud 13 from the base 14 in order to maintain the electrical insulation between the inner and the outer electrodes 10 and 11. Both flat surfaces of the ceramic washer 17 are metallized with a brazeable, electrically conductive layer 18.

The layer 18 is thus in electrical contact with the shroud 13. Thus far the basic structure of a conventional surge arrester has been described. The impulse ratios, as defined hereinbefore, of such a surge arrester, are found on average, to be approximately 1.5:1 or greater. Depending on the rise-time of the voltage surge occurring between the electrodes 10 and 11, the response time of the arrester might not be sufficiently short to prevent damage to the protected circuits or equipment.

It is expected that the response time of such devices would depend on the magnitude of primary ionizations produced as the surge voltage comes close to the range of breakdown value. These primary ionizations act as the "spark-plug" that precedes and occasions full breakdown, resulting in a much lowered resistance compared to prebreakdown conditions, thus shunting the damaging surge current away from protected equipment.

It has been found that the introduction of an ion source outside of the spark gap region within a region of stressed electric field results in a tangible improvement in the impulse ratio. In the preferred embodiment herein, the ion source is conductive and is introduced as a third electrode which is an extention of the outer electrode 11. The third electrode is a conductive band 19 of width W on the inside surface of the washer 17. The conductive band 19 is preferably a pencil band (2 H hardness has been found satisfactory) and is in electrical contact with the shroud 13 and the electrode 11 via the conductive layer 18. The band 19 acts as a third electrode and in cooperation with the stem 15 creates a stressed field therebetween which frees ions from the band 19 that migrate into the spark gap region, thus ensuring a more consistent breakdown. The important point is that some electrical connection must be established between the band 19 and the electrode 11. Because of the extremely high resistance between the electrodes 10 and 11 prior to breakdown, the "quality" of the electrical connection between the band 19 and the electrode 11 is not crucial.

Figure 2:
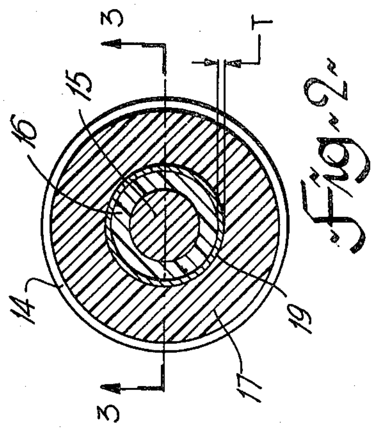
FIG. 2 is a cross-section of the surge arrester along the line 2—2 in FIG. 1.
Figure 3:
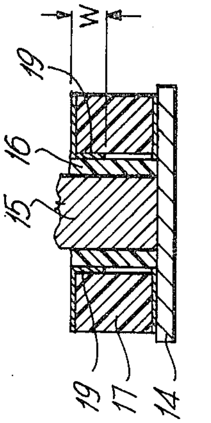
FIG. 3 is a cross-section along the line 3—3 in FIG. 2.

The ceramic washer 17 is shown in FIG. 2 with the band 19. The thickness T of the band 19 is that of a pencil tracing, but of course may be thicker with other deposition techniques without altering the effectiveness of the band. The width W of the band 19, indicated on FIG. 3, should be determined experimentally for best results in different structures, but in this preferred embodiment 0.03 inch is adequate where the washer 17 is 0.118 inch thick and the whole arrester is 0.314 inch in diameter and 0.788 inch in length.

Figure 4:
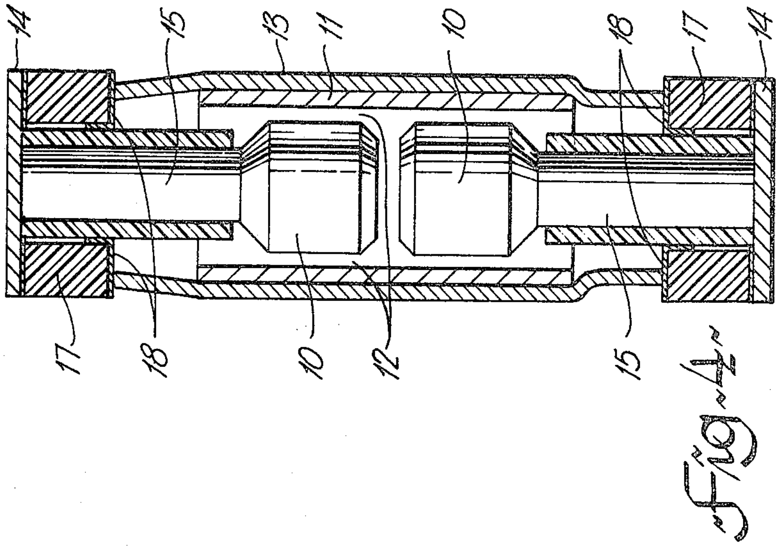
FIG. 4 is an axial cross-section of a three electrode surge arrester including the present invention.

FIG. 4 shows a three electrode version of the arrester of FIG. 1 which has two additional electrodes according to the present invention. Such arresters are often used to protect balanced telephone circuits where the outer electrode is grounded and the two inner electrodes are connected one to the tip conductor of the telephone circuit, and the other to the ring conductor of the same circuit or line. Such a balanced line surge arrester functions in the same manner as the single-ended arrester.

Figure 5C:
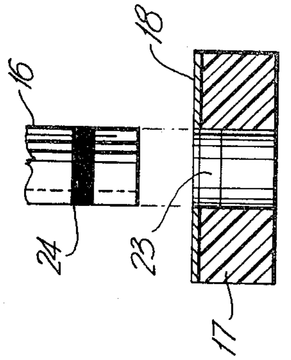
FIGS. 5*a*, 5*b* and 5*c* are examples of alternative applications of the ion source coating.
Figure 5B:
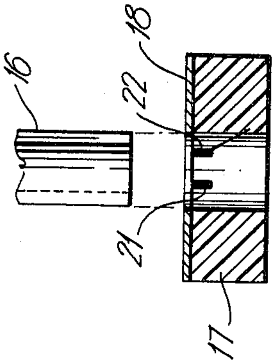
Figure 5A:
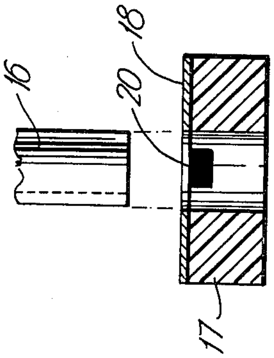

FIG. 5*a* of the drawings shows a cross-section of the washer 17 having a smaller pencilled area 20 instead of a full band connected to the metallization 18; the sleeve 16 is shown out of the washer. In FIG. 5*b* the pencil coating is reduced to a few stripes of which 21 and 22 are shown, all of which of course are in contact with the metallization 18. Both alternatives, in FIGS. 5*a* and 5*b* have been found to be effective.

If convenient, the metallization 18 on the top surface of the washer 17 may be extended inside the washer to form a metallization band 23 as shown in FIG. 5*c*. However, due to the fact that the metallization forming the band 23, while creating the necessary stressed field, is not effective as a source of ions, it is necessary to introduce the ion source as a coating on the dielectric sleeve 16 in the form of pencil band 24. When the sleeve 16 is in position the band 24 is within the stressed electric field and ions are freed therefrom upon onset of the surge. The fact that it may be in contact with the metallization 23 is of no consequence to its effectiveness.

In the preferred embodiment the position of the stressed electric field has been chosen to be in the very thin gas filled layer between the sleeve 16 surrounding the stem 15 and the conductive band 19 (or 23 in FIG. 5*c*). In a different surge structure, it may be necessary to add one or more electrodes to create such stressed electric field within which an ion source can be disposed, the only stipulation being that such ion source be outside of the main spark gap region although in communication therewith.

A summary of the characteristics of the surge arrester of the preferred embodiment is as follows:

| | |
|---|---|
| Outer Shell/Shroud: | OFHC Copper; |
| Outer Electrode: | 416 stainless steel; |
| Inner Electrode: | 416 stainless steel; |
| Base disc: | Kovar; |
| Dielectric insulating sleeve: | 94% (minimum) $Al_2O_3$ alumina ceramic; |
| Ceramic insulating washer: | 94% (minimum) $Al_2O_3$ alumina ceramic metallized on both |

-continued

| | |
|---|---|
| | flat ends for vacuum brazing; |
| Brazing filler material: | BT VTG silver copper eutectic alloy; |
| Gas fill: | 5% Hydrogen, 10% Argon and 85% Helium to a total pressure of approximately 200 mm Hg STP; and |
| Third Electrode: | Pencil band tracing with 2H hardness inside the ceramic insulating washer. The pencil band is 0.03 inches wide and is in contact with the top surface metallization. |

What is claimed is:

1. A gas filled surge arrester having a design breakdown voltage value and having first and second electrodes defining a gaseous spark gap therebetween, characterized by:

a surface coating of ion source material outside of said spark gap adapted to emit ions into the spark gap region in response to an electric field;

said surface coating being conductive and in electrical contact with said first electrode;

said surface coating being insulated from said second electrode by a continuous solid insulator, and having an exposed surface facing said second electrode, a gap being present between said coating and said insulator; and said surface coating cooperating with the second electrode to establish said electric field across said solid insulator in response to a rising surge voltage across the surge arrester, such that ions attracted from said surface coating are accelerated in the direction of said second electrode and exit into the spark gap region.

2. A surge arrester as claimed in claim 1, said ion source material adapted to emit said ions by being in an electric field induced by a surge voltage in the vicinity of the breakdown voltage value.

3. A surge arrester as defined in claim 2, said exposed surface being in close proximity to said second insulator such that voltage breakdown debris do not appreciably reach and damage said surface coating.

4. A surge arrester as defined in claim 3, said surface coating being a third electrode of a material from the group comprising graphite, sodium silicate, and barium aluminate mixed with a sodium silicate binder.

5. A surge arrester as defined in claim 4, said first and second electrodes being coaxial.

6. A surge arrester as defined in claim 1, 2 or 3, said first electrode being coaxial with and surrounding said second electrode.

7. A surge arrester as defined in claim 5, said third electrode being a conductive layer surrounding said second electrode at its base.

8. A surge arrester as defined in claim 7, said first electrode being a metallic shroud housing said surge arrester.

9. A surge arrester as defined in claim 8, said third electrode being a pencil tracing on inside surface of a ceramic washer containing at least 94% $Al_2O_3$ and surrounding said base of said second electrode and metallized on both its flat surfaces, a predetermined one thereof being in electrical contact with said pencil tracing.

10. A surge arrester as defined in claim 4, further comprising a fourth, fifth and sixth electrodes in a common gas filled arc chamber with said first, second and third electrodes, said fourth electrode being identical to said second electrode but supported from an opposite end of said surge arrester, said fifth electrode being identical with and electrically connected said first electrode and defining a spark gap with said fourth electrode, and said sixth electrode being identical with said third electrode but cooperating with said fourth electrode in a manner similar to said second and third electrodes.

11. A surge arrester as defined in claims 2, 4 or 10 being filled with a gas mixture of 5 to 10% Hydrogen, 5 to 10% Argon and 85% Helium.

12. A surge arrester as defined in claims 4 or 9 being filled with a gas mixture of 5% Hydrogen, 10% Argon and 85% Helium to a total pressure of approximately 200 mm Hg STP.

* * * * *